Aug. 23, 1966   A. BEDOL   3,267,880
SERVING TRAY FOR AUTOMOBILES
Filed Sept. 23, 1965
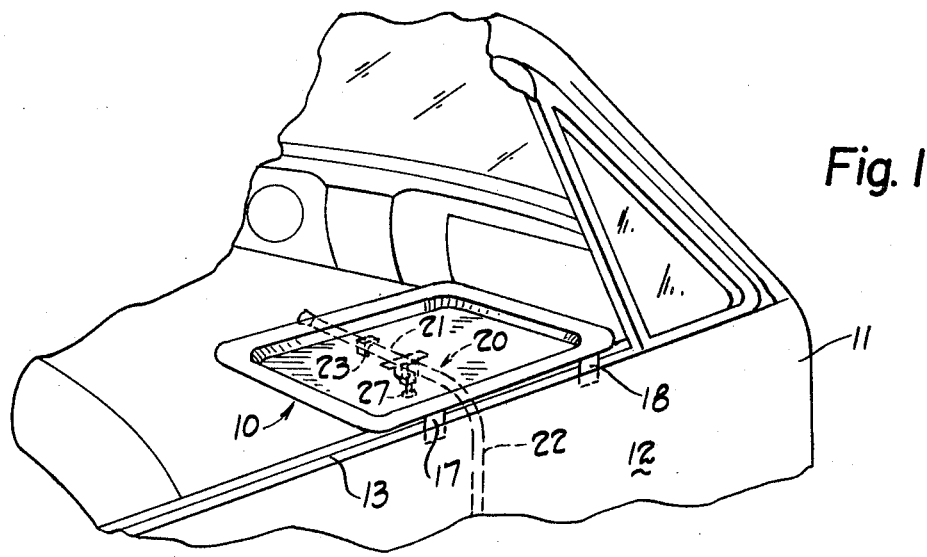
Fig. 1
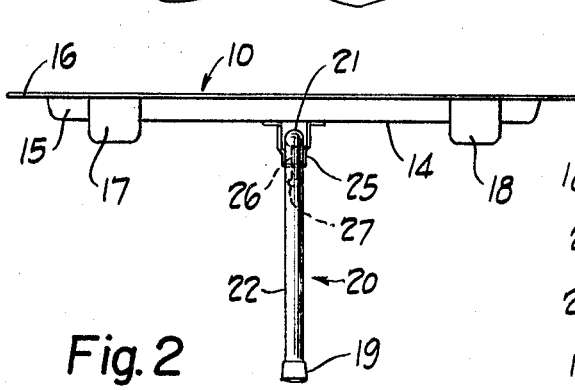
Fig. 2
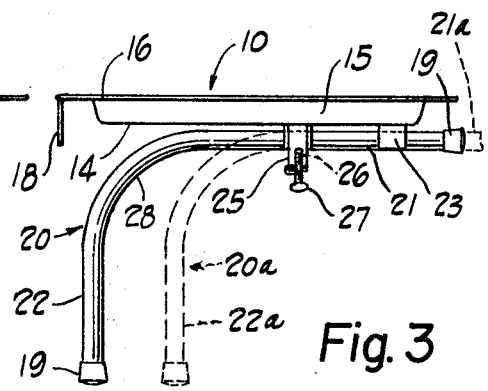
Fig. 3
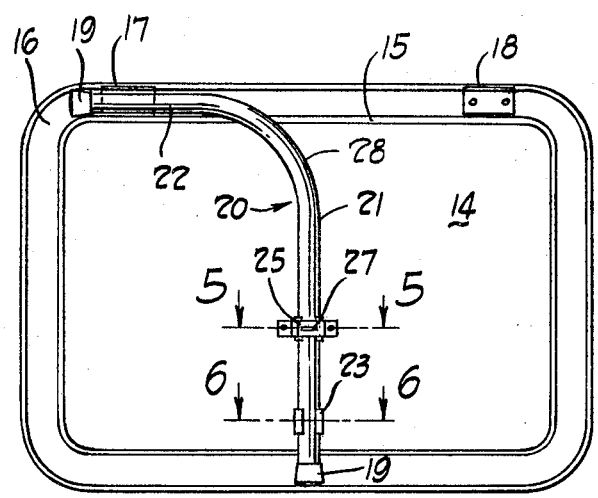
Fig. 4
Fig. 5   Fig. 6
INVENTOR.
ALAN BEDOL
BY
Sanford Schuurmacher
ATTORNEY.

3,267,880
SERVING TRAY FOR AUTOMOBILES
Alan Bedol, Shaker Heights, Ohio, assignor to Marshallan Manufacturing Company, Cleveland, Ohio, a corporation of Ohio
Filed Sept. 23, 1965, Ser. No. 489,499
1 Claim. (Cl. 108—46)

This invention relates to food serving trays and particularly to a tray adapted to be mounted in the window opening of an automobile door.

The primary object of this invention is to provide an improved portable type drive-in-restaurant food tray adapted to be securely mounted on the door of a motor vehicle and to support foodstuffs thereon for the convenience of persons seated in the vehicle.

Another object is to provide a food serving tray constructed in a manner whereby it may be readily mounted on either the exterior or interior side of a vehicle door.

A further object of the invention is to provide a serving tray construction in a manner whereby it is adapted to be secured to various types and widths of vehicle doors.

Another object is to provide a device of the type stated that can be compactly collapsed, when not in use, for easy storage under the front seat of a vehicle.

Still another object is to provide a serving tray which will conform to conventional forms of manufacture, be of simple construction and easy to use so as to provide a device that will be economically feasible, long lasting and relatively trouble-free in operation.

These, and other objects of the invention will become apparent from a reading of the following specification and claim, together with the accompanying drawing, wherein like parts are referred to and indicated by like reference numerals, and wherein:

FIGURE 1 is a fragmentary perspective view of a motor vehicle shown with the serving tray which is the subject of the instant invention mounted upon the inside of the right front door of the vehicle;

FIGURE 2 is a front elevation of the serving tray in its set-up, but, unmounted condition;

FIGURE 3 is a right end view of the same, showing the leveling arm in alternate positions;

FIGURE 4 is a bottom plan view of the serving tray with the leveling arm in its collapsed condition, ready for storage;

FIGURE 5 is a view, partly in section, taken along the line and in the direction of the arrows 5—5 of FIGURE 4; and, FIGURE 6 is a sectional view taken along the line and in the direction of the arrows 6—6 of FIGURE 4.

Referring more particularly to the drawing, there is seen in FIGURE 1 the serving tray that is the subject of the instant invention, broadly indicated by reference numeral 10, as it appears mounted upon the inside of the right front door 12 of a motor vehicle 11.

The tray, or body section 10, is fabricated from sheet metal of appropriate gauge, and may be given an attractive decorative finish.

The tray 10 has a rectangular planar surface defining a bottom 14, formed with a continuous upstanding bounding wall 15 having an outwardly extending rim 16, parallel to the plane of the tray bottom 14.

Reference numerals 17 and 18 indicate two longitudinally spaced ears, or fingers, mounted at the extreme outer edge of the tray rim 16, and depending therefrom in a vertical plane at 90° to the rim 16. The length of the fingers 17 and 18 is such that they extend substantially below the tray bottom 14, as is seen in FIGURES 2 and 3.

Two spaced resilient plastic bearing clips 23 and 24 are mounted on the underside of the tray bottom, in alignment crosswise thereof, between the fingers 17 and 18, as is seen most clearly in FIGURE 4.

Reference numeral 20 indicates a tubular "L-shaped" support arm having legs 21 and 22, joined through a gradually curved section 28, and positioned at 90° to each other.

One leg 21 is slidably mounted through the clips 23 and 24 for reciprocating movement parallel to the tray bottom 14, which movement causes the other leg 22, of arm 20, to be moved toward or away from the dependent fingers 17 and 18.

A lock frame 25 is mounted over the clip 24. The frame 25 has a thumb screw 27 threadedly fitted in the frame through a threaded shank 26 adapted to bear against the arm leg 21 and hold the arm 20 against longitudinal and rotational movement, when so engaged.

To mount the tray on the inside of the door 12, as illustrated in FIGURE 1, the lock screw 27 is rotated to free the arm leg 21 and the arm is moved through the clips away from the fingers 17 and 18, as indicated by reference numeral 20a in FIGURE 3.

The tray is positioned inside the door 12, and the fingers 17 and 18 inserted into the window well slot 13, between the inside window sealing gasket and the window pane. The arm 20 is then pushed toward the inside surface of the door until the dependent leg 22 rests thereagainst.

After contacting the door surface, the pressure on the arm is continued until the tray bottom assumes a horizontal position parallel to the ground and then locked in place by the thumb screw 27.

The so mounted tray 20 will be securely mounted on the door 12, as seen in FIGURE 1.

If contact between the door and the straight portion of leg 22, alone, does not move the tray 20 into a horizontal position, further movement of the arm 20 toward the door will cause the arm 20 to rock up on the curved section 28, which will effect leveling of the tray, after which the thumb screw can be made to lock and hold the arm in this position.

Since the fingers 17 and 18 depend from the extreme outer edge of the rim 16, as seen in FIGURE 3, the car window may be raised, during inclement weather, without disturbing the tray, inasmuch as the fingers fit between the window pane and its inner gasket in the slot 13.

It is of course to be understood that the tray 10 may be mounted on the outside of the door, at the window opening, in which case the arm 20 will bear against the outside face of the door 12 with the fingers 17 and 18 inserted in the window well slot 13 between its outer sealing gasket and the window pane.

When not in use the tray may be made into a compact, flat, package for storage under the front seat of the vehicle by loosening the thumb screw 27 and then rotating the arm 20 until its leg 22 lies flat against the tray bottom 14 against the inner face of one of the fingers, as seen in FIGURE 4.

The inherent resilience of the clips 23 and 24 cause frictional engagement between the clips and the arm leg 21 which prevents uncontrolled flopping around of the arm, when the thumb screw 27 is free of the arm leg 21.

It will now be clear that there has been provided a device which accomplishes the objectives heretofore set forth. While the invention has been disclosed in its preferred form, it is to be understood that the specific embodiment thereof, as described and illustrated herein, is not to be considered in a limited sense, as there may be other forms or modifications of the invention which should also be construed to come within the scope of the appended claim.

I claim:

A serving tray adapted to be mounted in the window opening of an automobile door, comprising in combination, (a) a rectangular planar surface, defining a tray bottom, bounded by a continuous upstanding wall having an outwardly extending rim parallel to the plane of the tray bottom, (b) two longitudinally spaced fingers, depending from one edge of the rim, said fingers being insertable into the window well of an automobile door, (c) two spaced resilient bearing clips mounted on the underside of the tray bottom, aligned cross-wise thereof between the dependent fingers, (d) a tubular "L"-shaped arm having one leg thereof slidably mounted through said clips for movement parallel to the tray bottom, toward and away from said dependent fingers, between adjusted positions, and with the other leg of said arm depending in a plane parallel to that of said fingers, and (e) means for locking said arm in adjusted positions; the depending leg of said arm being adapted to engage the vertical surface of an automobile door and cooperate with said fingers to hold said tray bottom in a horizontal plane when said fingers are positioned within the window well of an automobile door.

References Cited by the Examiner

UNITED STATES PATENTS

| | | | |
|---|---|---|---|
| 1,224,127 | 5/1917 | Bartlett | 108—47 X |
| 1,360,180 | 11/1920 | Congdon | 108—47 X |
| 2,558,366 | 6/1951 | Madlena | 108—47 |
| 2,763,378 | 9/1956 | Black | 108—47 X |
| 2,771,332 | 11/1956 | McGinley | 108—46 |
| 3,037,639 | 6/1962 | Kost | 211—86 |
| 3,125,040 | 3/1964 | Roberson | 108—47 X |
| 3,194,186 | 7/1965 | Brown et al. | 108—46 |

FRANK B. SHERRY, *Primary Examiner.*

G. O. FINCH, *Assistant Examiner.*